No. 770,002. PATENTED SEPT. 13, 1904.
T. L. GOOD.
LAWN SWING.
APPLICATION FILED APR. 4, 1904.
NO MODEL. 3 SHEETS—SHEET 1.

No. 770,002. PATENTED SEPT. 13, 1904.
T. L. GOOD.
LAWN SWING.
APPLICATION FILED APR. 4, 1904.
NO MODEL. 3 SHEETS—SHEET 3.

WITNESSES:
Edw M Harrington
Alfred A Lewis

INVENTOR:
Thomas L. Good
By Higdon Morgan Hopkins attys

No. 770,002. Patented September 13, 1904.

UNITED STATES PATENT OFFICE.

THOMAS L. GOOD, OF EDWARDSVILLE, ILLINOIS, ASSIGNOR OF SIX-SEVENTHS TO CHARLES E. LARMER, AMANDUS FREDRICKSON, BERTHA LARMER, EDGAR LARMER, CLAUDE LARMER, AND WILLIAM HAYES, OF ALTON, ILLINOIS.

LAWN-SWING.

SPECIFICATION forming part of Letters Patent No. 770,002, dated September 13, 1904.

Application filed April 4, 1904. Serial No. 201,575. (No model.)

*To all whom it may concern:*

Be it known that I, THOMAS L. GOOD, a citizen of the United States, and a resident of Edwardsville, Madison county, Illinois, have invented certain new and useful Improvements in Lawn-Swings, of which the following is a specification containing a full, clear, and exact description, reference being had to the accompanying drawings, forming a part hereof.

My invention relates to lawn-swings; and it consists of the novel features herein shown, described, and claimed.

Figure 1:
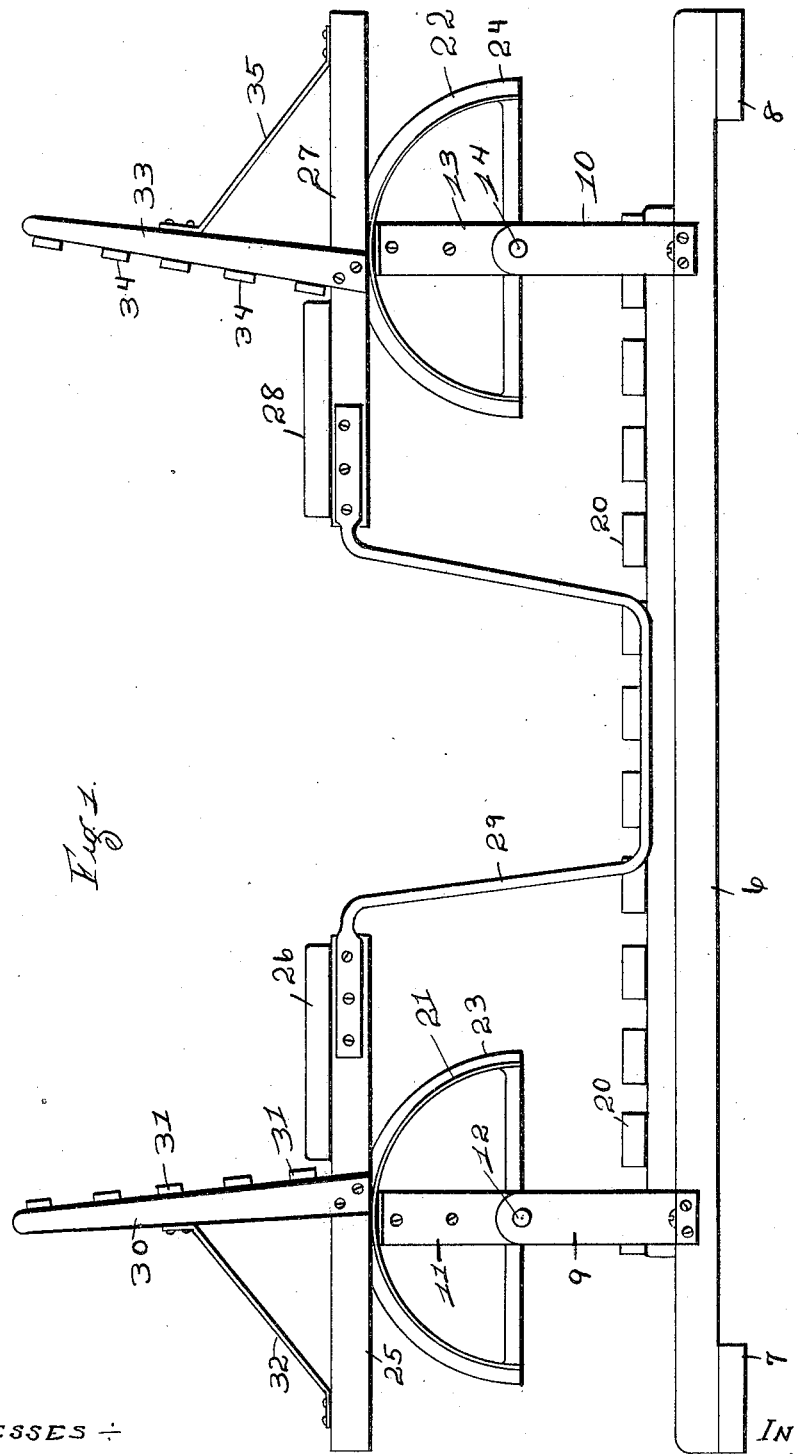
Figure 2:
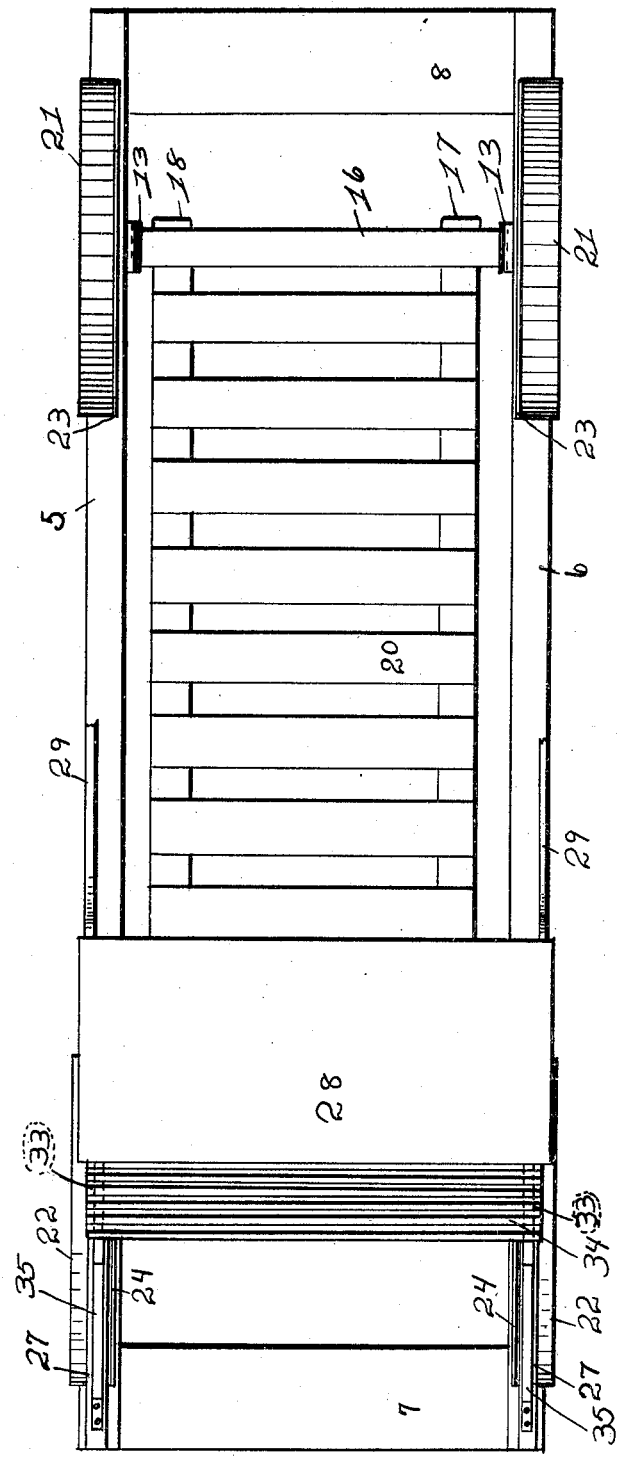
Figure 3:
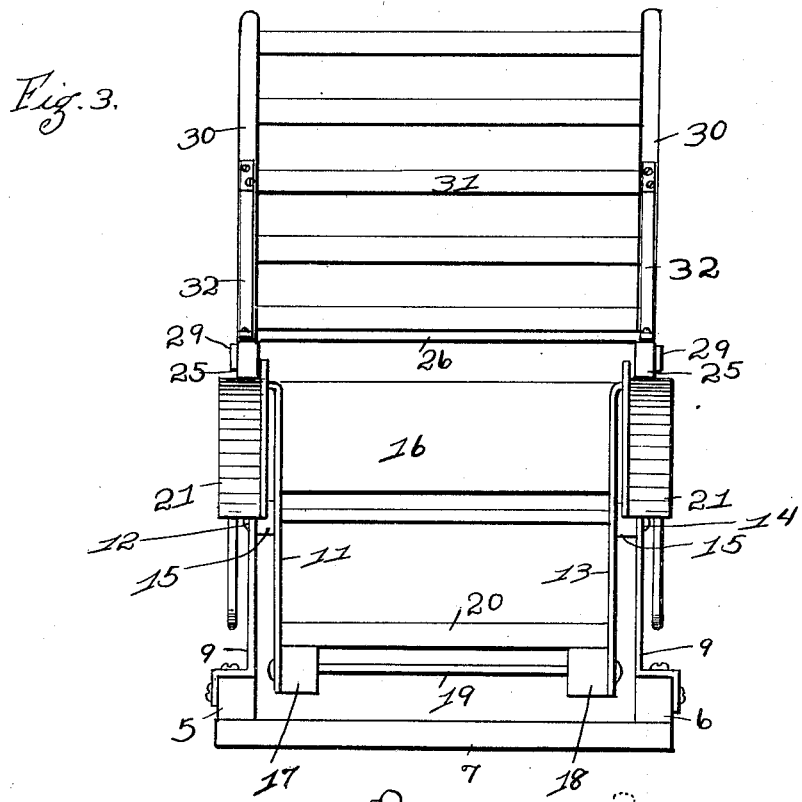
Figure 4:
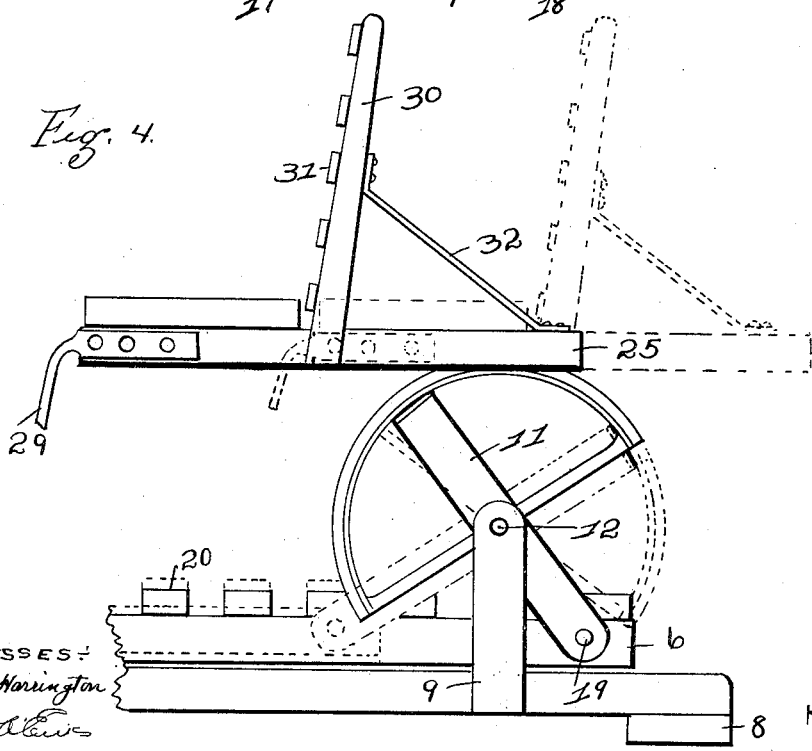

In the drawings, Figure 1 is a side elevation of a lawn-swing constructed in accordance with the principles of my invention. Fig. 2 is a top plan view with one of the seats removed. Fig. 3 is an end elevation. Fig. 4 is a side elevation of one end of the lawn-swing, illustrating the operation, the other end of the lawn-swing being broken away.

Referring to the drawings in detail, the side sills 5 and 6 are securely connected together at their ends by the cross-sills 7 and 8, thus forming a rectangular base, and a pair of supporting-posts 9 is mounted upon one end of the frame, and a similar pair of supporting-posts 10 is mounted upon the other end of the frame. A pair of operating-levers 11 is pivotally connected to the upper ends of the posts 10 by the pivots 12, and a similar pair of operating-levers 13 is pivotally connected to the upper ends of the posts 10 by the pivots 14. The pivots 12 and 14 are substantially at the centers of the levers 11 and 13. Spacing-blocks 15 are placed one inside of each post, and the levers are placed inside of the spacing-blocks. The pivots are inserted through the posts, spacing-blocks, and levers, one pivot serving for each pair of posts, as shown in Fig. 3. A brace 16 connects the upper ends of the levers 13 together, and a similar brace connects the upper ends of the levers 11 together. The swinging sills 17 and 18 are connected to the lower ends of the levers 11 and 13 by the pivots 19, there being one pivot for each pair of levers. The boards 20 connect the swinging sills 17 and 18, said boards being arranged suitable distances apart to form a swinging platform. A pair of concentric supporting-tracks 21 are attached to the upper halves of the levers 11, said tracks being in the form of a half-circle in side elevation, and a similar pair of tracks 22 is attached to the upper halves of the levers 13. Flanges 23 extend upwardly from the inner edges of the tracks 21, and similar flanges 24 extend upwardly from the inner edges of the tracks 22. A pair of track-bars 25 is mounted upon the tracks 21, said track-bars 25 being rigidly connected together by the seat 26, and a similar pair of track-bars 27 is mounted upon the tracks 22 and rigidly connected together by the seat 28. A pair of connecting-rods 29 connects the track-bars 25 to the track-bars 27, the central portions of said bars being bent downwardly beside the swinging platform. A pair of arms 30 extend upwardly from the track-bars 25, said arms being rigidly connected by the slats 31, said slats forming a back for the seat 26, and braces 32 connect the upper parts of the arms 30 to the track-bars 25. Arms 33 extend upwardly from the track-bars 27, said arms being rigidly connected by slats 34, and braces 35 connect said arms to the track-bars, so as to form a back for the seat 28.

The operation is illustrated in Fig. 4. The seats 26 and 28 move backwardly and forwardly in a horizontal plane, said seats being supported by the track-bars 25 and 27, resting upon the tracks 21 and 22. As the seats travel backward and forward the swinging platform will vibrate up and down as well as backward and forward, the supporting-pivots of said platform being carried in a circle. The operators will sit upon the seats 26 and 28 with their feet upon the swinging platform, and the weight of the persons will be thrust first upon the swinging platform and then upon the seats.

I claim—

1. In a lawn-swing: supporting-posts; operating-levers pivotally mounted upon the posts normally in vertical positions; a swinging platform pivotally connected to the lower ends of the levers; segmental tracks rigidly mounted upon the upper ends of the levers; seats connecting said tracks transversely; and rods connecting said tracks longitudinally; substantially as specified.

2. In a lawn-swing: supporting-posts; operating-levers pivotally mounted upon said posts normally in vertical positions; a swinging platform connected to the lower ends of said levers; segmental tracks connected to the upper ends of said levers; and seats supported by said tracks, so that as the platform swings, the seats will travel backward and forward in a horizontal plane; substantially as specified.

3. In a lawn-swing: supporting-posts; levers pivotally mounted upon said supporting-posts normally in vertical positions: a platform connected to and carried by the lower ends of said levers; segments connected to and carried by the upper ends of said levers; seats supported by said segments and connected together, so that the operators may sit upon the seats with their feet upon the platform, so that as the platform swings, the seats will travel backward and forward in a horizontal plane; substantially as specified.

In testimony whereof I have signed my name to this specification in presence of two subscribing witnesses.

THOMAS L. GOOD.

Witnesses:
P. F. WEBER,
CHAS. W. MARKS.